United States Patent Office 3,533,816
Patented Oct. 13, 1970

3,533,816
PREPARATION OF HIGH RATIO
ALKALI METAL SILICATES
Aaron Oken, Kennett Square, Pa., assignor to E. I. du Pont de Nemours and Company, Wilmington, Del., a corporation of Delaware
No Drawing. Filed Oct. 22, 1965, Ser. No. 502,317
Int. Cl. C09d 1/02; C09j 1/02
U.S. Cl. 106—74      2 Claims

ABSTRACT OF THE DISCLOSURE

A silicic acid solution is rapidly mixed with an alkali metal hydroxide or silicate solution at room temperature to give a solution having a $SiO_2$: $M_2O$ mol ratio in the range of about 4 to 6 or 8 to 40 and the solution is concentrated by vacuum evaporation at a temperature up to 45° C.

---

This invention relates to a method for preparing alkali metal silicate solutions having a high ratio of silica to alkali metal. It is more particularly directed to a process for preparing a stable solution of an alkali metal silicate having a $SiO_2$:$M_2O$ mol ratio in the range about 4 to 6 or 8 to 40, where M represents an alkali metal ion selected from sodium potassium and lithium, by mixing an alkali metal hydroxide or silicate solution with a dilute silicic acid solution and concentrating the resulting solution by evaporating and removing a portion of the water under reduced pressure.

The starting material for use in the novel process of this invention is a dilute solution of silicic acid. Suitable solutions are made by the well-known process first described in Bird U.S. Pat. 2,244,325 comprising contacting a sodium or potassium silicate solution with a strong acid cation exchange resin in the hydrogen form. The silicate solution used may have any mol ratio of $SiO_2$:$M_2O$ from 1:1, that is metasilicate, up to about 3.9:1.

When the silicate solution is contacted with the cation exchange resin, the alkali metal anion is substantially completely removed, resulting in a solution of silicic acid. The silicate solution used should be sufficiently diluted to provide a silicic acid solution having a $SiO_2$ concentration of less than about 3.5% by weight, preferably between 3.0 and 3.5% by weight. More concentrated silicic acid solutions tend to gel too rapidly for practical use. Any commercial sodium silicate solution can be used, but if a concentrated solution is used, it must be diluted to provide a $SiO_2$ content within the desired range.

It is important to the success of the process that the sodium silicate solution used to produce the dilute silicic acid solution be clear-white. Turbidity in the solution indicates the presence of high molecular weight silica polymers which will make the products tend to gel. Turbidity can be eliminated simply by filtering the solution prior to use.

Any strong acid cation exchange resin can be used to produce the silicic acid solution. Examples of suitable commercial resins are "Amberlite" IRC-50, "Zeokarb," "Ionex," "Nalcite," and "Dowex" 50–W.

Having provided a suitable silicic acid solution, the next step in the process is to mix sufficient concentrated alkali metal hydroxide or silicate solution with the dilute silicic acid to provide a solution having a $SiO_2$:$M_2O$ mol ratio in the range of about 4 to 6 or 8 to 40. The amount of alkali metal hydroxide or silicate solution necessary to produce a solution having a mol ratio within the desired range will of course depend upon the concentration of the hydroxide or silicate, the molecular weight of the alkali metal, and whether a hydroxide or silicate of the metal is used, as well as the concentration of silica in the silicic acid solution. The determination of the proper amount of hydroxide or silicate to use in a given case can be readily determined by simple calculation.

The concentration of the hydroxide or silicate solution used for ratio adjustment is not critical, although it is normally preferred to use a relatively concentrated solution in order to avoid the necessity of removing a large excess of water in the subsequent concentration step.

The concentration of silica in the solution after admixture of the silicic acid will vary between a value slightly below the concentration of silica in the silicic acid up to around 11–12%. For example, where a 15% LiOH solution is mixed with a 3.2% silicic acid solution to provide a lithium silicate having a mol ratio of $SiO_2$:$Li_2O$ of 4, the concentration of $SiO_2$ in the lithium silicate solution will be about 3.1%. On the other hand, where a sodium silicate solution having a $SiO_2$:$Na_2O$ mol ratio of about 3.2 and a $SiO_2$ concentration of about 28% is mixed with a silicic acid solution of about 3.2% $SiO_2$ concentration to provide a sodium silicate solution having a mol ratio of 4:1, the concentration of the resulting solution will be about 11–12%.

It will be understood that in making the lithium silicates of this invention, it will be necessary to use lithium hydroxide for admixture to the silicic acid solution, since lithium silicates corresponding to the ordinary commercial sodium and potassium silicates having $SiO_2$:$M_2O$ mol ratios below 4:1 are not available.

In making sodium silicate solutions according to the process of this invention, it is preferred to mix with the silicic acid solution a sodium silicate solution having a silica content in the range of about 26–29% and a $SiO_2$:$Na_2O$ mol ratio of about 3 to 3.3. Thus the same solution which is used to make the dilute silicic acid solution by dilution and treatment with a cation exchange resin can be used to adjust the $SiO_2$:$M_2O$ mol ratio of the product to within the range of 4 to 40. Here, as in the case of making the silicic acid solution, the sodium silicate solution should be free of turbidity. Where potassium silicates are used to adjust the $SiO_2$:$M_2O$ ratio they should likewise be free of turbidity and should be filtered prior to use if turbidity is present.

The silicic acid and the alkali metal hydroxide or silicate may be mixed in any order. Where the alkali is added to the acid, it is essential that it be added rapidly with vigorous agitation in order to raise the pH of the mixture rapidly to a value above about 8. Between pH values of about 4 and 6 the stability of silicic acid with regard to gelling is at a minimum, as shown by FIG. 5 on p. 45 of Iler, The Colloid Chemistry of Silica and Silicates, Cornell University Press, Ithaca, N.Y., (1955). Where the acid is added to the alkali metal hydroxide or silicate, of course, the mixture does not go through this pH range, so rapid addition and agitation are not so important.

The agitation required when adding the alkali to the acid may be produced by any conventional means. On the laboratory scale, use of an ordinary propeller mixer gives satisfactory results. On a larger scale, the components can conveniently be fed simultaneously in the proper proportions into the suction of a centrifugal pump. Many other suitable methods will be apparent to those skilled in the art.

After the dilute solution of silicic acid has been mixed with the alkali metal hydroxide or silicate solution, the dilute product is concentrated by vacuum evaporation. The concentration step must be carried out under reduced pressure because the temperature necessary to vaporize the water at atmospheric pressure causes rapid particle growth and eventually gellation. Thus, it is necessary to carry out the evaporation at a temperature in the range of ordinary room temperature (about 27° C.) up to about 45° C. Lower temperatures could of course be used but are not necessary. Higher temperatures produce undue particle growth in the solution. Preferably the concentration is carried out at a temperature between about 30 and 35° C.

The concentration operation may be either batch or continuous. The concentration of the final product can vary depending upon the ratio of $SiO_2:M_2O$. For example, a solution having a $SiO_2:M_2O$ mol ratio of 4:1 can be concentrated up to about 24% by weight of $SiO_2$ without becoming unstable. A solution having a $SiO_2:M_2$ ratio of 40:1 however, can be concentrated only up to about 10% by weight silica before becoming unstable. At a ratio of 5 the maximum concentration is about 20% and at a ratio of 10 the maximum concentration is about 15% by weight.

The concentration step should be carried out as soon as feasible, at least within a week, and preferably within less than 24 hours. The reason for this is that the dilute solutions of alkali metal silicates exhibit particle growth upon aging and eventually become unstable. Surprisingly, this particle growth either does not occur or is much less rapid in the concentrated solutions of this invention. In order to prevent this rapid particle growth, it has been found necessary to concentrate a solution having a $SiO_2:M_2O$ ratio of 4:1 to at least about 18% and preferably to about 20% by weight of $SiO_2$. Similarly, a solution having a $SiO_2:M_2O$ ratio of about 40:1 should be concentrated to at least about 5% and preferably to at least about 8% by weight $SiO_2$ as soon as possible. For solutions of intermediate ratio the final concentration required for stabilizing the solutions will be between 5 and 20% and can be determined by simple experimentation. Solutions with $SiO_2/M_2O$ ratios between about 6 and 8 cannot be stabilized by concentrating. Particle size in the final product is too small to be readily discernible by electron micrographs, which indicates that the particles are below about 5 m$\mu$ in size.

The alkali metal silicate solutions produced according to this invention have numerous applications as adhesives, coating agents, and liquid vehicles for coating compositions. They can be applied for example to paper, fabric, or wood to provide a fire-proof and moisture-proof coating. They can be mixed with conventional paint ingredients such as pigments, inert fillers, and organic polymer emulsions to provide coating compositions for application to various surfaces such as plaster, brick, concrete and the like. In addition, they can be used as binders for zinc-rich paints, which are used to protect metallic surfaces exposed to corrosive conditions. The solutions can also be used in oil well sand consolidation. Numerous other uses will be apparent to those skilled in the art.

In order to further describe the invention, the following illustrative examples are given:

EXAMPLE 1

(1) A commercial sodium silicate solution (Dupont "F" grade sodium silicate) is filtered on a pressure leaf filter using neoprene impregnated paper. For the filtration a filter aid ("Hy-Flo Supercel") is added to the solution. The solution contains 28.4% $SiO_2$ with a $SiO_2:Na_2O$ mol ratio of 3.25. The solution after filtration is diluted with water to provide a $SiO_2$ content of 3.2% by weight.

The diluted solution is then contacted with the hydrogen form of a sulfonated divinyl benzene-styrene copolymer cation exchanger sold commercially as "Nalcite-HCR," in order to remove the sodium ion. After deionization, the resulting silicic acid solution has a silica concentration of 3.2% and a pH of about 3. The silicic acid particles in the solution are below about 4 millimicrons in average diameter.

(2) To one hundred parts by weight of the dilute acid solution prepared as above are added 50 parts by weight of the same filtered "F" grade sodium silicate solution used in preparing the dilute acid. The silicate is added to the acid contained in an ordinary laboratory beaker at room temperature. The addition is made as rapidly as possible while agitating the contents of the beaker with a propellor mixer. The pH of the mixture rises almost instantaneously to a value of about 10 and then rises more gradually until a final pH of about 11 is reached when all of the silicate has been added.

The sodium silicate solution resulting has a $SiO_2:Na_2O$ mol ratio of 4 and a $SiO_2$ concentration of about 11.5% by weight. The particles in the solution immediately after preparation have diameters of less than 5 millimicrons.

(3) The dilue sodium silicate solution is then placed in a flask and concentrated under vacuum at a temperature of 30° C. Removal of water continues until the concentration of silica in the solution is 24%. The resulting solution is clear-white and is stable upon storage for long periods of time.

EXAMPLE 2

Example 1 is repeated except that the amount of sodium silicate solution added to the silicic acid in step 2 is 20 parts by weight, giving a dilute solution with a $SiO_2:Na_2O$ ratio of 5:1 and a $SiO_2$ concentration of 7.1%. In step 3, this dilute solution is concentrated under vacuum at 30° C. to a $SiO_2$ concentration of 20%. The concentrated sodium silicate solution is free of turbidity and is stable in storage for at least several months.

EXAMPLE 3

Example 1 is repeated, except that the amount of sodium silicate solution added to the 100 parts of silicic acid in step 2 is 0.94 parts by weight. The resulting solution contains 3.3% by weight $SiO_2$ at a $SiO_2:Na_2O$ ratio of 40:1. In step 3, this solution is concentrated to a $SiO_2$ content of 10% by weight. The ratio of silica to sodium oxide remains constant at 40:1.

This 10% solution contains only particles having diameters less than 5 millimicrons. The solution is clear-white and is storage-stable. The solution cannot be further concentrated without gellation.

EXAMPLE 4

A silicic acid solution is prepared by the method of step 1 of Example 1. To one hundred parts by weight of this solution contained in a beaker is added 31.6 parts by weight of a filtered potassium silicate solution having a $SiO_2$ concentration of 26.3% and a $SiO_2:K_2O$ mol ratio of 3.3:1. The contents of the beaker are vigorously agitated using a propellor mixer during the addition.

The resulting solution has a $SiO_2:K_2O$ mol ratio of 4.5:1 and a silica content of about 8.6% by weight.

The dilute potassium silicate solution is then concentrated by vacuum evaporation at a temperature of 35° C. to a final silica content of 25% by weight. The concentrated solution is free of turbidity and is stable for a period of at least several months.

EXAMPLE 5

A potassium silicate solution is prepared as described in Example 4 except that the amount of the $K_2SiO_3$ solution added to the 100 parts by weight of silicic acid is 1.52 parts by weight. The resulting solution has a $SiO_2:K_2O$ mol ratio of 29 and a $SiO_2$ concentration of about 3.4% by weight.

This dilute potassium silicate solution is then concentrated under vacuum to a $SiO_2$ concentration of 12% by weight. The resuting solution is clear-white and stable.

EXAMPLE 6

A dilute silicic acid solution is prepared as described in step 1 of Example 1. To 100 parts of this solution is added 2.44 parts by weight of a 13% by weight LiOH solution. The LiOH is added rapidly to the acid contained in a beaker with vigorous agitation of the contents. The resulting solution of lithium silicate has a $SiO_2:Li_2O$ mol ratio of 8:1 and a $SiO_2$ concentration of about 3.1%.

The dilute lithium silicate solution is then concentrated by evaporation of a portion of the water under vacuum at a temperature of 35° C. until a solution having a $SiO_2$ content of 20% by weight is obtained. The concentrated lithium silicate is clear-white and storage-stable.

EXAMPLE 7

Example 6 is repeated except that the amount of 13% LiOH solution added to the 100 parts by weight of dilute silicic acid is 0.48 part by weight to give a dilute (3.2% silica) solution having a $SiO_2:Li_2O$ mol ratio of 38. This solution is concentrated by evaporation under vacuum at a temperature of 27° C. to provide a lithium silicate solution having a $SiO_2$ concentration of 10% by weight. The particles in this solution are all under 5 millimicrons in diameter. The solution is clear-white and storage-stable.

The invention claimed is:

1. A method for making a stable sodium silicate solution having a $SiO_2:Na_2O$ ratio between about 4–6 to 1 and about 8–40 to 1 comprising radipdly mixing with agitation in the proper proportions a dilute solution of silicic acid substantially free of alkali metal anions having a $SiO_2$ content of less than about 3.5% by weight with a sodium silicate solution having a $SiO_2$ concentration of about 26–29% by weight and a $SiO_2:Na_2O$ ratio in the range of about 3:1 to 3.3:1, said mixing being at room temperature, then concentrating the solution by vacuum evaporation at a temperature in the range of about 27° C. to 45° C. in order to stabilize the solution against particle growth.

2. A process as defined in claim 1 wherein the sodium silicate solution is added to the silicic acid while the latter is under vigorous agitation, the rate of addition being sufficiently rapid to avoid gellation of the silicic acid while passing through the pH range of about 4 to about 6.

References Cited

UNITED STATES PATENTS

| | | | |
|---|---|---|---|
| 3,180,746 | 4/1965 | Patton et al. | 106—74 |
| 3,180,747 | 4/1965 | Patton et al. | 106—74 |
| 3,392,039 | 7/1968 | Cuneo | 106—74 |
| 1,357,183 | 10/1920 | Phillips et al. | 106—74 |

FOREIGN PATENTS

| | | |
|---|---|---|
| 625,033 | 8/1961 | Canada. |
| 163,877 | 6/1921 | Great Britain. |

JAMES E. POER, Primary Examiner

U.S. Cl. X.R.

106—84